US006921842B2

(12) United States Patent
Senzaki et al.

(10) Patent No.: US 6,921,842 B2
(45) Date of Patent: Jul. 26, 2005

(54) HYDROGENATED AROMATIC OLIGOMERS AND PROCESS FOR PREPARING THE SAME

(75) Inventors: Toshihide Senzaki, Fukuoka (JP); Takahiro Imamura, Fukuoka (JP); Takehiro Shimizu, Fukuoka (JP); Munehito Nagai, Fukuoka (JP)

(73) Assignee: Nippon Steel Chemical Co., Ltd., Tokyo (JP)

( * ) Notice: Subject to any disclaimer, the term of this patent is extended or adjusted under 35 U.S.C. 154(b) by 8 days.

(21) Appl. No.: 10/332,575

(22) PCT Filed: Jul. 11, 2001

(86) PCT No.: PCT/JP01/06017

§ 371 (c)(1),
(2), (4) Date: Jan. 10, 2003

(87) PCT Pub. No.: WO02/06365

PCT Pub. Date: Jan. 24, 2002

(65) Prior Publication Data

US 2004/0014930 A1 Jan. 22, 2004

(30) Foreign Application Priority Data

Jul. 13, 2000 (JP) ....................................... 2000-212784

(51) Int. Cl.[7] ............................................... C07C 39/12
(52) U.S. Cl. ....................................... 568/719; 568/819
(58) Field of Search ................................. 568/719, 819

(56) References Cited

U.S. PATENT DOCUMENTS 2,129,153 A * 9/1938 Schirm ........................ 528/86
2,139,231 A * 12/1938 Hentrich et al. ......... 525/501.5
2,161,951 A * 6/1939 Carmody .................... 528/205
2,330,827 A * 10/1943 Kester ........................ 528/160
2,638,458 A * 5/1953 Wheeler .................. 525/501.5
4,187,369 A * 2/1980 Pavlikov et al. ............ 528/137
5,128,232 A * 7/1992 Thackeray et al. ......... 430/192
6,713,591 B1 * 3/2004 Senzaki et al. ............. 528/129

FOREIGN PATENT DOCUMENTS

JP 46-41613 12/1971
JP 49-14595 2/1974
JP 49-107329 10/1974
JP 53-24973 7/1978
JP 58-176210 A1 10/1983
JP 05-311148 A1 11/1993
JP 11-100424 4/1999
WO WO 01/16199 A1 3/2001

OTHER PUBLICATIONS

Supplementary European Search Report to co–pending application mailed on May 28, 2004.
International Preliminary Examination Report dated Oct. 8, 2002.
A copy of International Search Report mailed on Oct. 23, 2001.

* cited by examiner

*Primary Examiner*—Michael L. Shippe
(74) *Attorney, Agent, or Firm*—Rader, Fishman & Grauer PLLC

(57) ABSTRACT

The hydrogenated aromatic oligomer of this invention is represented by the following formula (1)

$$(A\text{-}F)_n\text{-}A \quad (1)$$

(wherein A is a segment comprising mainly a polycyclic aromatic compound, a phenol and at least partly hydrogenated products of these two, F is methylene or dimethylene ether and n is a number in the range of 1–100) and obtained by the reaction of a polycyclic aromatic compound such as naphthalene with formaldehyde or a derivative thereof and a phenol in the presence of an acid catalyst followed by hydrogenation of the product aromatic oligomer. This oligomer is odorless, highly transparent and useful as an improver of the adhesiveness and vibration damping properties when incorporated in resins and rubbers and performs excellently as a vibration damping agent in a wide temperature range.

7 Claims, 3 Drawing Sheets

HYDROGENATED AROMATIC OLIGOMERS AND PROCESS FOR PREPARING THE SAME

FIELD OF TECHNOLOGY

This invention relates to a hydrogenated aromatic oligomer, a process for preparing the same and a vibration damping agent utilizing the same. The hydrogenated aromatic oligomer of this invention is useful as a resin modifier and incorporated in resins and rubbers to improve their tackiness and vibration damping properties.

BACKGROUND TECHNOLOGY

Resins obtained by the reaction of phenols with formaldehyde or a derivative thereof in the presence of an acid catalyst are well known as phenolic resins or novolak resins. Likewise, resins obtained by the reaction of aromatic hydrocarbons such as xylene and naphthalene with formaldehyde or a derivative thereof in the presence of an acid catalyst are well known as hydrocarbon resins. Furthermore, indene-coumarone resins and petroleum resins are also known as hydrocarbon resins, but formaldehyde or a derivative thereof is not used in this case because of the presence of olefinic linkages in indene or coumarone itself.

There is a description in JP53-24973 B that an aromatic oil resin obtained by the reaction of an aromatic oil with formaldehyde or a derivative thereof in the presence of an acid catalyst is used as an ingredient in formulating coatings. The aromatic oil used here is light oil, carbolic oil, naphthalene oil and the like and the hue varies from light yellow to brown. For this reason, the aromatic oil resin in question has found limited use in applications requiring transparency.

A variety of proposals have been made for control of vibration damping properties by the use of hydrocarbon resins; for example, commercial petroleum resin and commercial coumarone-indene resin in JP63-11980 A and JP62-141069 A and commercial polybutene, terpene resin and modified rosin in JP02-49063 A. Furthermore, an alkylbenzene-methylnaphthalene resin described in JP07-90130 A offers an example of the use of polycyclic aromatic resin.

A vibration damping agent to be incorporated in a base such as rubber, resin and bitumen in order to improve the vibration damping properties should desirably satisfy the requirement that tan $\delta$ (dissipation factor) of the resulting vibration damper is large in the use range and shows a small temperature dependence. However, these properties are known to be contrary to each other in many cases.

A process for hydrogenating hydrocarbon resins such as petroleum resins is described in JP2000-103820 A and elsewhere.

DISCLOSURE OF THE INVENTION

An object of this invention is to provide a novel resin which is highly transparent and can be used in a variety of areas where oligomers such as hydrocarbon resins are used. Another object of this invention is to provide a hydrogenated aromatic resin which performs excellently as a vibration damping agent.

This invention relates to a hydrogenated aromatic oligomer represented by the following formula (1)

$$(A\text{-}F)_n\text{-}A \qquad (1)$$

(wherein A is a segment comprising mainly a polycyclic aromatic compound or a hydrogenated polycyclic aromatic compound and a phenol or a hydrogenated phenol and comprising at least partly a hydrogenated polycyclic aromatic compound and/or a hydrogenated phenol, F is methylene and dimethyhlene ether and n is a number of 1–100).

This invention also relates to a hydrogenated aromatic oligomer obtained by hydrogenating an aromatic oligomer represented by the following formula (2)

$$(A'\text{-}F)_n\text{-}A' \qquad (2)$$

(wherein A' is a segment comprising mainly a polycyclic aromatic compound and a phenol, F is methylene and dimethylene ether and n is a number of 1–100).

Moreover, this invention relates to a process for preparing a hydrogenated oligomer which comprises reacting an aromatic hydrocarbon oil containing one or more of naphthalene, methylnaphthalene and acenaphthene with formaldehyde or its derivative selected from compounds generating formaldehyde in the reaction system such as paraformaldehyde and a phenol in the presence of an acid catalyst to form an aromatic oligomer and then hydrogenating the aromatic oligomer.

Still more, this invention relates to a vibration damping agent comprising the aforementioned hydrogenated aromatic oligomer.

To begin with, the hydrogenated aromatic oligomer of this invention and the process for preparing it will be explained. The hydrogenated aromatic oligomer is generally obtained as a mixture unless a pure raw material is used and may contain resins that cannot be represented by formula (1) and it is to be understood that the principal constituent of the hydrogenated aromatic oligomer, namely, 50% or more, preferably 80% or more, is represented by formula (1). Unless otherwise specified, % relating to purity or concentration in the specification is wt %. The constituent of the aromatic oligomer means the unit or radical of the monomer such as naphthalene, methylnaphthalene, acenaphthene and a phenol while present in the oligomer and, for the simplicity of description, the unit or radical of the monomer in the oligomer is simply referred to, for example, as naphthalene or a phenol on occasion.

The hydrogenated aromatic oligomer represented by formula (1) can be prepared by hydrogenating the aromatic oligomer represented by formula (2), but the method of preparation is not limited to this particular one.

An explanation will be given first to the aromatic oligomer and then to the hydrogenated aromatic oligomer below.

The aromatic compound raw materials needed for the preparation of the aromatic oligomer represented by formula (2) are a polycyclic aromatic compound such as naphthalene, methylnaphthalene and acenaphthene and a phenol. Such aromatic compound raw materials consist of a polycyclic aromatic compound and a phenol or consist of the foregoing two and other aromatic compounds that account for 50% or less, preferably 20% or less, of the total. Such other aromatic compounds include alkylbenzenes.

The composition of the aromatic compound raw materials favorable for the preparation of the oligomer represented by formula (2) is 60–80% of the sum of polycyclic aromatic compounds, 20–40% of phenols and less than 10% of other aromatic compounds. Naphthalene, methylnaphthalene or acenaphthene is preferred as polycyclic aromatic compound and accounts for 60–100% of the entire polycyclic aromatic compounds.

The aforementioned aromatic compound raw materials are either products with a purity of 90–100% or aromatic hydrocarbon oils mainly containing these raw materials. The aromatic hydrocarbon oils include fractions corresponding to naphthalene oil, methylnaphthalene oil and middle oil derived from tar oil or intermediate products and residual oils obtained by recovering the principal constituents of these fractions by such means as distillation. The raw materials should preferably be free from N and S that act as catalyst poison in the hydrogenation reaction. Additionally, preferred aromatic hydrocarbon raw materials include crude naphthalene, 95% grade naphthalene, crude methylnaphthalene and crude acenaphthene.

The aromatic hydrocarbon oil should naturally contain polycyclic aromatic compounds as main constituents, but it may contain other aromatic compounds and inert aliphatic hydrocarbons in small amounts. The unrefined aromatic hydrocarbon oil may contain phenols and such phenols are included in the calculation of the phenols. Phenols used apart from the aromatic hydrocarbon oil are not included in the calculation of the aromatic hydrocarbon oil.

Formaldehyde or a derivative thereof to be used for the preparation of the aromatic oligomer represented by formula (2) may satisfactorily be a compound which generates formaldehyde in the reaction system and formaldehyde itself, formalin or paraformaldehyde can be used, paraformaldehyde being advantageous.

Phenols to be used for the preparation of the aromatic oligomer represented by formula (2) include phenol, alkylphenols such as cresol, xylenol and t-butylphenol, polyhydric phenols such as pyrogallol and hydroxyl-containing polycyclic aromatic compounds such as naphthol. Of these phenols, phenol and monohydric phenols such as lower alkylphenols containing 1 to 6 carbon atoms are preferred from the viewpoint of the reactivity and the properties of oligomers.

The catalyst to be used in the preparation of the aromatic oligomer is an acid catalyst and inorganic acids such as sulfuric acid, phosphoric acid and hydrochloric acid, organic acids such as oxalic acid and toluenesulfonic acid and solid acids such as silica-alumina, zeolite, ion exchange resin and acid clay can be used. Preferred acids are organic acids such as oxalic acid and toluenesulfonic acid. The use of an acid that undergoes thermal decomposition, for example, oxalic acid brings about a beneficial effect that the procedure for removal of the catalyst can be omitted.

The ratio of polycyclic aromatic compounds (excepting phenols) a, phenols b and formaldehyde or a derivative thereof c in use is as follows, although it may vary somewhat depending upon the amount of other aromatic compounds; $c/(a+b)=0.1–0.9$, preferably 0.2–0.6, on a mole basis where the value equivalent to formaldehyde is used for any derivative of formaldehyde in calculating the molar ratio and $b/a=0.05–10$, preferably 0.1–1.0, more preferably 0.2–0.5, on a weight basis.

Formaldehyde or a derivative thereof is necessary for raising the molecular weight of the aromatic oligomer and for increasing the conversion of naphthalene and other aromatic compounds. With the use of an excessive amount of formaldehyde or a derivative thereof, gelation may occur or the terminal methylol groups may remain behind in a large amount. Phenols not only raise effectively the molecular weight of the aromatic oligomer but also provide the oligomer with adequate polarity to improve the adhesiveness to a metallic material, but the use of too much phenols causes the aromatic oligomer to lose its characteristic properties as hydrocarbon resin. Polycyclic aromatic compounds act to improve vibration damping properties, control adequately the polarity of aromatic oligomer and enhance the compatibility with other resins, rubbers and solvents.

The amount of acid catalyst to be used is generally 0.5–20 wt % of the reactants, though it may vary with the kind of acid catalyst, and it is preferably 5–10 wt % in the case of oxalic acid.

The reaction conditions may vary with the raw materials and the catalyst to be used and normally the reaction temperature is 50–180° C. and the reaction time is 0.5–5 hours. In this reaction, formaldehyde or a derivative thereof, a polycyclic aromatic hydrocarbon and a phenol react with one another and, in case the phenol is present in a small amount, the reaction yields an oligomer such as a phenol-modified hydrocarbon resin. When the phenol is present in a large amount in the reaction system, the product is an oligomer such as hydrocarbon-modified novolak resin. A solvent may be used if necessary.

Upon completion of the reaction, the reaction mixture is distilled first to remove the low-boiling substances such as water and formaldehyde and then to remove the unreacted raw materials and other fractions under reduced pressure and at a higher temperature in the range of 200–250–300° C. The residue is the aromatic oligomer. Upon completion of the reaction, the reaction mixture may be washed with water to remove the catalyst if necessary. The reaction terminates when the catalyst is removed by water washing, but the reaction partly progresses during the distillation if water washing is not performed.

The aromatic oligomer obtained in this manner comprises the aromatic oligomer represented by the aforementioned formula (2) as main constituent. In formula (2), A' is a segment comprising mainly (a) polycyclic aromatic compound and (b) phenol and F is methylene or methylene and —$CH_2OCH_2$—. Preferably $(b)/(a)=10/90–30/70$ on a weight basis while F contains 90 mol % or more, preferably 95 mol % or more, of methylene and may contain 20–30 mol % of —$CH_2OCH_2$— depending upon the end use.

The number n is 1–100 and, preferably, the mean of this number is in the range of 2–20. The number average molecular weight is preferably in the range of 300–1,000 while the weight average molecular weight is in the range of 500–2,000 and the ratio of the two is in the range of 1.5–3. The softening point of the aromatic oligomer is in the range of 50–180° C., preferably 70–160° C. If the softening point is too low or too high, the temperature range in which a good vibration damping performance is obtained deviates from the normal range of usage or the compatibility deteriorates.

It has been found that, in the aromatic oligomer obtained by the use of oxalic acid as a catalyst and by a high-temperature treatment, oxygen originating in the formaldehyde or the derivative thereof escapes nearly completely from the system. On the other hand, when the reaction was carried out under mild conditions by the use of sulfuric acid, oxygen originating in the formaldehyde or the derivative thereof was found to remain in the oligomer. This difference is likely caused by whether the formaldehyde is linked to the aromatic ring by the methylene linkage or by the ether linkage such as —$CH_2OCH_2$—.

The content of oxygen originating in the ether linkage is 3 wt % or less, preferably 1 wt % or less, in the aromatic oligomer while the total content of oxygen including the one originating in phenols such as alkylphenols is 20 wt % or less, preferably 10 wt % or less.

The hydrogenated aromatic oligomer of this invention can be obtained by hydrogenating the aforementioned aromatic oligomer. The hydrogenation can be carried out by a known procedure; for example, the aromatic oligomer is treated with hydrogen under heat and pressure in the presence of a hydrogenation catalyst containing a metal such as nickel, cobalt and molybdenum or a compound thereof or in the presence of a hydrogenation catalyst based on a noble metal such as platinum, palladium and rhodium. The hydrogenation catalyst may be supported on a carrier such as alumina, silica, kieselguhr and carbon. Preferably, the hydrogen pressure is in the range of 1–100 MPa and the reaction temperature is in the range of 150–350° C.

The hydrogenation is carried out to such an extent as to cause partial hydrogenation of the aromatic rings, preferably 20% or more, more preferably 30% or more, still more preferably 50% or more. However, it is sometimes desirable that the aromaticity remains behind depending upon the end use and, in such a case, the aromatic oligomer is hydrogenated until coloration nearly disappears or to the extent of 40–80%.

The hydrogenated aromatic oligomer of this invention obtained in this manner is represented by the aforementioned formula (1). In formula (1), A is a segment comprising mainly (a) polycyclic aromatic compound, (b) phenol and (c) hydrogenation products of the foregoing two and comprising (c) as essential constituent. F and n are as explained earlier in respect to formula (2).

The softening point of the hydrogenated aromatic oligomer is in the range of 50–180° C., preferably 70–160° C. A too low or too high softening point causes the temperature range in which a good vibration damping performance is obtained to deviate from the normal range of usage or deteriorates the compatibility.

The content of oxygen originating in the ether linkage is 3 wt % or less, preferably 1 wt % or less, in the aromatic oligomer while the total content of oxygen including the one originating in phenols such as alkylphenols is 15 wt % or less, preferably 10 wt % or less.

The hydrogenated aromatic oligomer of this invention can be used in the areas where the conventional hydrocarbon resins, petroleum resins and their hydrogenation products are used and also shows an excellent performance as a vibration damping agent.

The vibration damping agent of this invention comprises the aforementioned hydrogenated aromatic oligomer and the oligomer in question can be used as it is or after purification or molecular weight fractionation. The vibration damping agent of this invention is incorporated in resin, rubber or bitumen to be used as a vibration damper. In addition to the vibration damping agent of this invention, a variety of additives such as known vibration damping agents, fillers such as carbon black, calcium carbonate, titanium oxide, clay, talc, mica and alumina, process oil and antioxidants may be incorporated in a vibration damper.

Advantageously, the vibration damping agent of this invention is incorporated in a rubber such as SBR, butyl rubber, natural rubber, diene rubber, chloroprene and modification thereof by hydrogenation or in an elastic resin such as EVA (ethylene-vinyl acetate resin) until its content reaches 10–70%, preferably 30–60%. Moreover, it is possible to obtain a good vibration damping performance in a wider temperature range by using a combination of plural vibration damping agents of this invention. Furthermore, the combined use of the vibration damping agent of this invention together with another vibration damping agent can improve the defects of such another vibration damping agent.

PREFERRED EMBODIMENTS OF THE INVENTION

Figure 1:
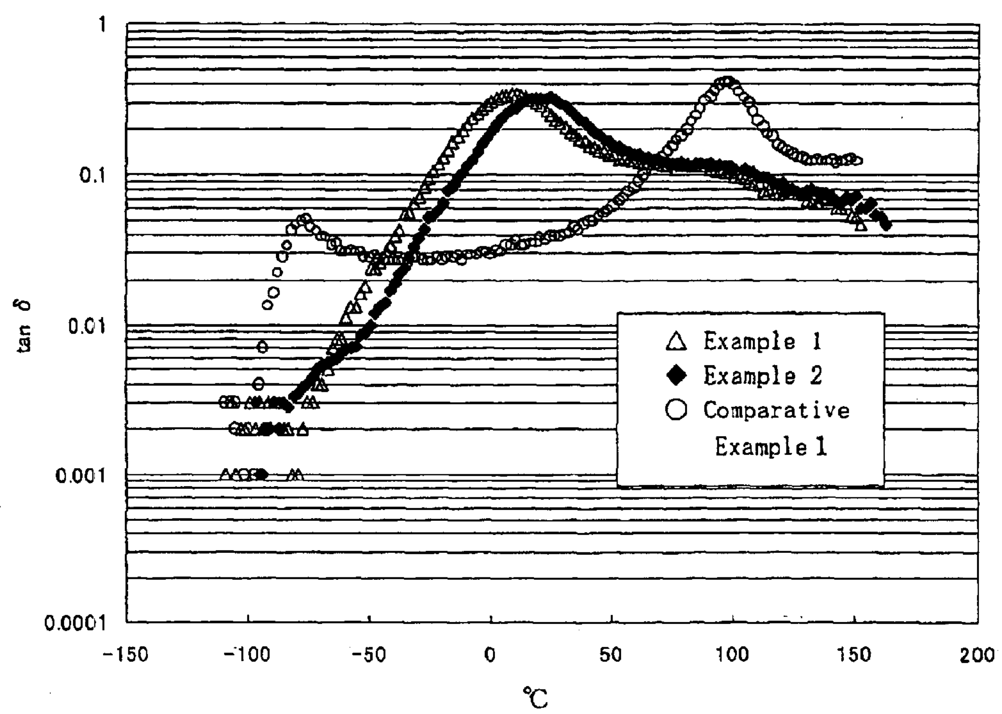
FIGS. 1–3 are graphs illustrating the relationship between tan δ and temperature when the hydrogenated aromatic oligomer of this invention is used as a vibration damping agent.

This invention will be described with reference to the examples. In the examples, % is wt % and part is part by weight.

EXAMPLE 1

In a flask were placed 135 parts of desulfurized naphthalene (naphthalene content, 99%), 68 parts of p-tert-butylphenol and 37 parts of 92% paraformaldehyde, the mixture was kept at 110° C., and 23 parts of oxalic acid was added to the mixture. The mixture was then allowed to react at 130° C. with stirring for 2.5 hours to form an oligomer. The water formed and other low-boiling substances were refluxed.

Upon completion of the reaction, a condenser was attached to the flask and the distillation was started at normal pressure. The low-boiling substances such as water and formaldehyde distilled by the time the temperature reached 200° C. The pressure was then reduced to 50 mmHg and the distillation was continued to recover the unreacted raw materials while raising the temperature from 200° C. to 270° C. The fraction containing the recovered raw materials amounted to 66 parts. The resin remaining in the flask was an aromatic oligomer with a softening point of 110° C. and amounted to 110 parts. The aromatic oligomer ranged from yellow to brown in hue. The oxygen content of the aromatic oligomer was 6.6% by elemental analysis.

In an autoclave were placed 100 parts of the aromatic oligomer and 500 parts of isopropyl alcohol, hydrogen was passed in at 230° C. and 10 MPa in the presence of 5 parts of stabilized nickel (G-96D, available from Sud-Chemie Catalysts Japan, Inc.) as a hydrogenation catalyst while stirring the reaction mixture at 1,000 rpm and the reaction was continued until the absorption of hydrogen stopped. Upon completion of the reaction, the catalyst was filtered and the isopropyl alcohol was distilled off to yield 105 parts of a hydrogenated aromatic oligomer.

The degree of hydrogenation calculated from the amount of absorbed hydrogen was approximately 60%, the hue was improved by the hydrogenation and a transparent resin ranging in hue from white to light yellow was obtained. The oxygen content of hydrogenated aromatic oligomer A was 5.2%.

(Evaluation of Vibration Damping Properties)

Hydrogenated aromatic oligomer A and SBR (Tufprene A, available from Asahi Chemical Industry Co., Ltd.) were weighed to form a 1:1 mixture and dissolved in THF.

A test specimen for evaluating the vibration damping properties by DSA (Dynamic Spring Analysis) was prepared by impregnating a small spring (outer diameter, 5 mm; length, 29 mm) with the solution and drying at room temperature for 24 hours to form a film of the resin-rubber mixture in a gap of the spring.

The specimen was measured for the viscoelasticity in the temperature range from −11° C. to 150° C. in a measuring apparatus (RHEOBIBRON DDV-II-EP, a product of Orientech) and the results are plotted as a tan δ-temperature graph in FIG. 1. The peak value and the temperature of maximum tan δ are shown in Table 1.

EXAMPLE 2

In a flask were placed 135 parts of desulfurized methylnaphthalene oil (methylnaphthalene 80%, acenaphthene 5%), 68 parts of p-tert-butylphenol and 37 parts of 92% paraformaldehyde, the mixture was kept at 110° C. and 23 parts of oxalic acid was added to the mixture. As in Example 1, the reaction was allowed to proceed with stirring at 130° C. for 2.5 hours to form an oligomer. Upon completion of the reaction, the low-boiling substances and then the unreacted raw materials were distilled. The fraction containing the recovered raw materials amounted to 66 parts. The resin remaining in the flask was an aromatic oligomer with a softening point of 120° C. and amounted to 125 parts. The aromatic oligomer ranges from yellow to brown in hue. The oxygen content of the oligomer was 6.1%.

As in Example 1, 100 parts of this aromatic oligomer was hydrogenated until the absorption of hydrogen stopped. Upon completion of the reaction, the catalyst was filtered and the isopropyl alcohol was distilled to yield 105 parts of hydrogenated aromatic oligomer B.

The degree of hydrogenation calculated from the amount of absorbed hydrogen was approximately 60%, the hue was improved by the hydrogenation and a transparent resin ranging in hue from white to light yellow was obtained. The oxygen content of hydrogenated aromatic oligomer B was 4.5%.

Hydrogenated aromatic oligomer B was evaluated for its vibration damping properties as in Example 1. The results are shown in FIG. 1 and Table 1.

EXAMPLE 3

In a flask were placed 250 parts of desulfurized naphthalene (naphthalene content, 99%), 10 parts of cresol and 50 parts of 88% paraformaldehyde and a condenser was attached to the flask. While maintaining the mixture at 100° C., 60 parts of 70% sulfuric acid was added in drops to the mixture and the reaction was allowed to proceed at 120° C. for 3 hours with stirring to form an oligomer.

Upon completion of the reaction, the reaction mixture was transferred to a separatory funnel, 40 parts of toluene was added and the resulting mixture was left standing at 80° C. for 1 hour. The lower aqueous layer was separated and the organic layer was neutralized, washed and distilled initially at normal pressure. The low-boiling substances such as water and formaldehyde distilled by the time the temperature reached 200° C. The pressure was then reduced to 50 mmHg and the distillation was continued to distil the unreacted raw materials while raising the temperature from 200° C. to 230° C. The resin remaining in the flask was a light yellow aromatic oligomer with a softening point of 80° C. and amounted to 220 parts. The oxygen content of the aromatic oligomer was 6.7%.

As in Example 1, 100 parts of the aromatic oligomer was hydrogenated until the absorption of hydrogen stopped. Upon completion of the reaction, the catalyst was filtered and the isopropyl alcohol was distilled to yield 105 parts of hydrogenated aromatic oligomer C.

The degree of hydrogenation calculated from the amount of absorbed hydrogen was approximately 50%, the hue was improved by the hydrogenation and a white transparent resin was obtained. The oxygen content of hydrogenated aromatic oligomer C was 5.5%.

Figure 2:
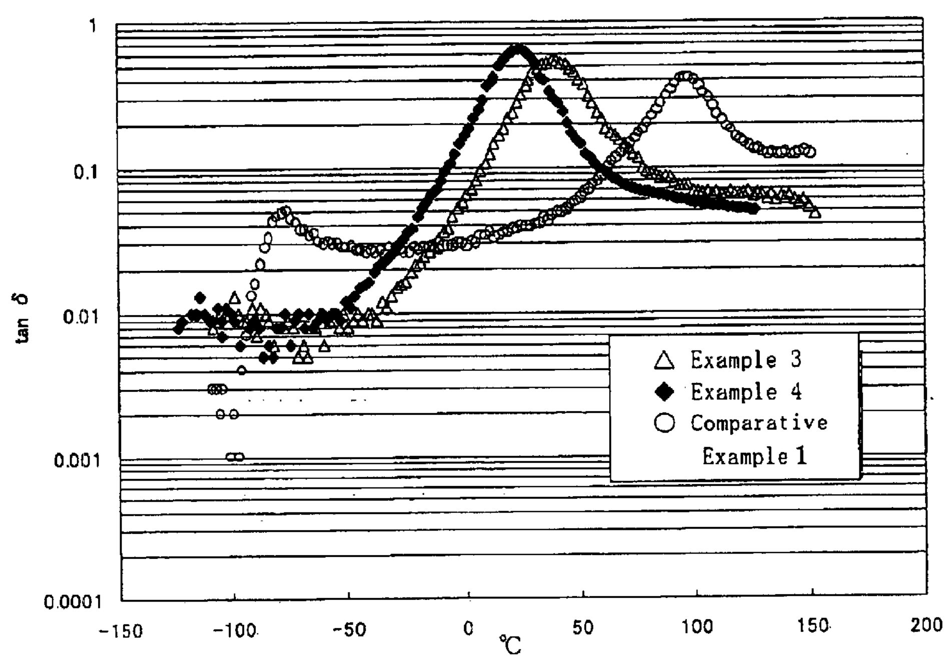

Hydrogenated aromatic oligomer C was evaluated for its vibration damping properties as in Example 1. The results are shown in FIG. 2 and Table 1.

EXAMPLE 4

In a flask were placed 250 parts of desulfurized naphthalene (naphthalene content, 99%), 5 parts of phenol and 50 parts of 88% paraformaldehyde and a condenser was attached to the flask. While maintaining the mixture at 100° C., 60 parts of 70% sulfuric acid was added in drops to the mixture and the reaction was allowed to proceed at 120° C. for 3 hours with stirring to form an oligomer.

Upon completion of the reaction, the low-boiling substances and then the unreacted raw materials were distilled as in Example 3. The resin remaining in the flask was a light yellow aromatic oligomer with a softening point of 75° C. and amounted to 215 parts. The oxygen content of the aromatic oligomer was 6.0%.

As in Example 1, 100 parts of the aromatic oligomer was hydrogenated until the absorption of hydrogen stopped. Upon completion of the reaction, the catalyst was filtered and the isopropyl alcohol was distilled to yield 105 parts of hydrogenated aromatic oligomer D.

The degree of hydrogenation calculated from the amount of absorbed hydrogen was approximately 60%, the hue was improved by the hydrogenation and a white transparent resin was obtained. The oxygen content of hydrogenated aromatic oligomer D was 5.0%.

Hydrogenated aromatic oligomer D was evaluated for its vibration damping properties as in Example 1. The results are shown in FIG. 2 and Table 1.

EXAMPLE 5

In a flask were placed 250 parts of desulfurized naphthalene (naphthalene content, 99%) and 50 parts of 88% paraformaldehyde and a condenser was attached to the flask. While maintaining the mixture at 100° C., 60 parts of 70% sulfuric acid was added in drops to the mixture and the reaction was allowed to proceed at 120° C. for 3 hours with stirring to form an oligomer.

Upon completion of the reaction, the low-boiling substances and then the unreacted raw materials were distilled as in Example 3. The resin remaining in the flask was a light yellow aromatic oligomer with a softening point of 60° C. and amounted to 210 parts. The oxygen content of the aromatic oligomer was 4.0%.

As in Example 1, 100 parts of the aromatic oligomer was hydrogenated until the absorption of hydrogen stopped. Upon completion of the reaction, the catalyst was filtered and the isopropyl alcohol was distilled to yield 105 parts of hydrogenated aromatic oligomer E.

The degree of hydrogenation calculated from the amount of absorbed hydrogen was approximately 60%, the hue was improved by the hydrogenation and a white transparent resin was obtained. The oxygen content of hydrogenated aromatic oligomer E was 3.0%.

Figure 3:
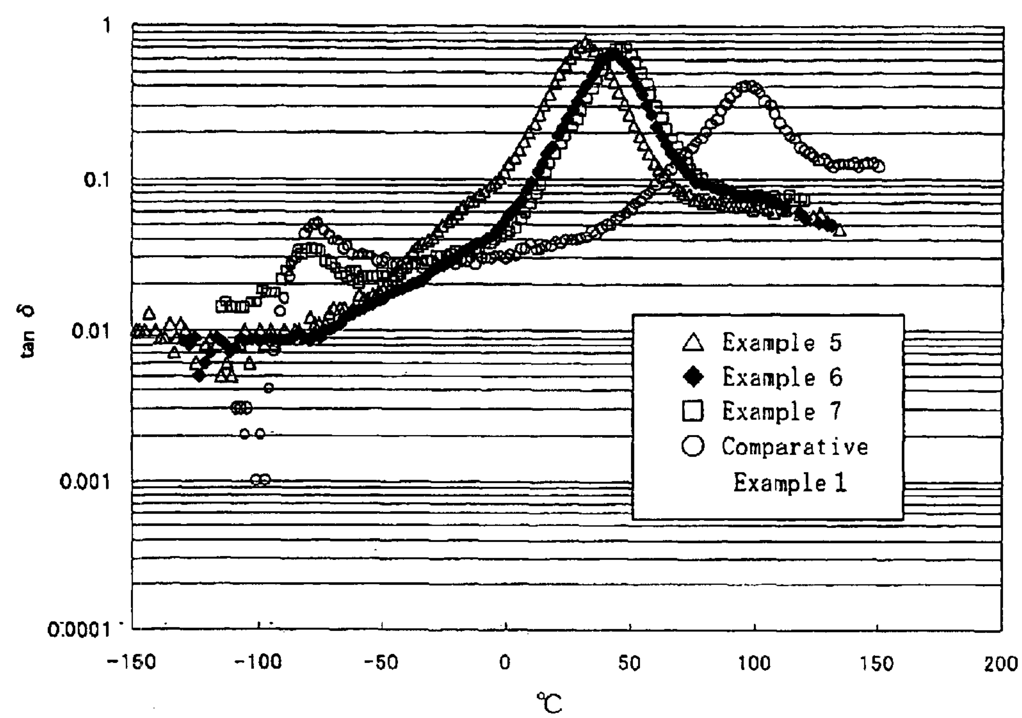

Hydrogenated aromatic oligomer E was evaluated for its vibration damping properties as in Example 1. The results are shown in FIG. 3 and Table 1.

EXAMPLE 6

In a flask were placed 250 parts of desulfurized methylnaphthalene oil (methylnaphthalene 80%, acenaphthene 5%) and 50 parts of 88% paraformaldehyde and a condenser was attached to the flask. While maintaining the mixture at 100° C., 60 parts of 70% sulfuric acid was added in drops to the mixture and the reaction was allowed to proceed at 120° C. for 3 hours with stirring to form an oligomer.

Upon completion of the reaction, the low-boiling substances and then the unreacted raw materials were distilled as in Example 3. The resin remaining in the flask was a light yellow aromatic oligomer with a softening point of 95° C. and amounted to 240 parts. The oxygen content of the aromatic oligomer was 4.5%.

As in Example 1, 100 parts of the aromatic oligomer was hydrogenated until the absorption of hydrogen stopped. Upon completion of the reaction, the catalyst was filtered and the isopropyl alcohol was distilled to yield 104 parts of hydrogenated aromatic oligomer F.

The degree of hydrogenation calculated from the amount of absorbed hydrogen was approximately 60%, the hue was improved by the hydrogenation and a white transparent resin was obtained. The oxygen content of hydrogenated aromatic oligomer F was 3.5%.

Hydrogenated aromatic oligomer F was evaluated for its vibration damping properties as in Example 1. The results are shown in FIG. 3 and Table 1.

EXAMPLE 7

In a flask were placed 250 parts of desulfurized methylnaphthalene oil (methylnaphthalene 80%, acenaphthene 5%), 100 parts of p-cresol and 50 parts of 88% paraformaldehyde and a condenser was attached to the flask. While maintaining the mixture at 100° C., 30 parts of 70% sulfuric acid was added in drops to the mixture and the reaction was allowed to proceed at 120° C. for 3 hours with stirring to form an oligomer.

Upon completion of the reaction, the low-boiling substances and then the unreacted raw materials were distilled as in Example 3. The resin remaining in the flask was a light yellow aromatic oligomer with a softening point of 165° C. and amounted to 123 parts. The oxygen content of the aromatic oligomer was 17%.

As in Example 1, 100 parts of the aromatic oligomer was hydrogenated until the absorption of hydrogen stopped. Upon completion of the reaction, the catalyst was filtered and the isopropyl alcohol was distilled to yield 104 parts of hydrogenated aromatic oligomer G.

The degree of hydrogenation calculated from the amount of absorbed hydrogen was approximately 50%, the hue was improved by the hydrogenation and a white transparent resin was obtained. The oxygen content of hydrogenated aromatic oligomer G was 13%.

Hydrogenated aromatic oligomer G was evaluated for its vibration damping properties as in Example 1. The results are shown in FIG. 3 and Table 1.

COMPARATIVE EXAMPLE 1

Without using the oligomer, SBR (Tufprene A, available from Asahi Chemical Industry Co., Ltd.) was dissolved in THF and the solution was evaluated for the vibration damping properties as in Example 1. The results are shown in FIGS. 1–3 and Table 1.

TABLE 1

| | Maximum tan δ | |
|---|---|---|
| Example | Peak value | Temperature (° C.) |
| 1 | 0.342 | 10.6 |
| 2 | 0.322 | 20.6 |
| 3 | 0.525 | 38.0 |
| 4 | 0.645 | 23.0 |
| 5 | 0.769 | 31.5 |
| 6 | 0.646 | 42.6 |
| 7 | 0.707 | 46.6 |
| Comparative example 1 | 0.405 | 96.5 |

As is shown in FIGS. 1–3, the addition of the hydrogenated aromatic oligomer was able to manifest a tan δ peak that was absent when SBR alone was used in the range from 0° C. to 50° C. and the effect for providing the rubber with the vibration damping properties is recognized.

Industrial Applicability

The hydrogenated aromatic oligomer of this invention is highly transparent and useful as a vibration damping agent and it can be prepared economically by the process of this invention.

The hydrogentated aromatic oligomer of this invention is odorless and hence useful from the aspect of use environment. The aromatic oligomer is relatively easy to prepare and shows an excellent vibration damping performance in a wide temperature range either alone or in combination with others.

What is claimed is:

1. A hydrogenated aromatic oligomer represented by the following general formula (1)

$$(A\text{-}F)_n\text{-}A \quad (1)$$

wherein A is a segment comprising mainly a polycyclic aromatic compound or a hydrogenated polycyclic aromatic compound, and a phenol or a hydrogenated phenol, and comprising at least partly a hydrogenated polycyclic aromatic compound and/or a hydrogenated phenol, F is methylene or dimethylene ether, and n is a number of 2–20, wherein the hydrogenated aromatic oligomer is derived from a reaction comprising a formaldehyde or a derivative thereof, a polycyclic aromatic compound, and a phenol, wherein (i) the ratio of formaldehyde or derivative thereof divided by the sum of polycyclic aromatic compound (excepting phenols) and phenol is 0.2–0.6 on a mole basis and (ii) the ratio of phenol divided by polycyclic aromatic compound (excepting phenols) is 0.2–0.5 on a weight basis, and wherein the hydrogenated aromatic oligomer comprises a number average molecular weight in the range of 300–1,000, and a weight average molecular weight in the range of 500–2000.

2. A hydrogenated aromatic oligomer obtained by hydrogenating an aromatic oligomer represented by the following formula (2)

$$(A'\text{-}F)_n\text{-}A' \quad (2)$$

wherein A' is a segment comprising mainly a polycyclic aromatic compound and a phenol, F is methylene or dimethylene ether, and n is a number of 2–20, wherein the aromatic oligomer is derived from a reaction comprising a formaldehyde or a derivative thereof, a polycyclic aromatic compound, and a phenol, wherein (i) the ratio of formaldehyde or derivative thereof divided by the sum of polycyclic aromatic compound (excepting phenols) and phenol is 0.2–0.6 on a mole basis and (ii) the ratio of phenol divided by polycyclic aromatic compound (excepting phenols) is 0.2–0.5 on a weight basis, and wherein the hydrogenated aromatic oligomer comprises a number average molecular weight in the range of 300–1,000, and a weight average molecular weight in the range of 500–2,000.

3. A hydrogenated aromatic oligomer as described in claim 2 wherein the degree of hydrogenation of the aromatic rings is 30 mol % or more.

4. A hydrogenated aromatic oligomer as described in claim 2 wherein the hydrogenated aromatic oligomer is obtained by hydrogenating an aromatic oligomer with a softening point of 50–180° C. and an oxygen content of 20 wt % or less and exhibits an oxygen content of 15 wt % or less.

5. A process for preparing a hydrogenated aromatic oligomer which comprises reacting an aromatic hydrocarbon oil containing one or more of naphthalene, methylnaphthalene and acenaphthene with formaldehyde or a derivative of formaldehyde, generating formaldehyde in the reaction system and a phenol in the presence of an acid catalyst to yield an aromatic oligomer, and hydrogenating the aromatic oligomer.

6. A vibration damping agent comprising the hydrogenated aromatic oligomer described in claim 1 or 2.

7. The process according to claim 5, wherein (i) the ratio of formaldehyde or derivative thereof divided by the sum of polycyclic aromatic compound (excepting phenols) in said aromatic hydrocarbon oil and phenol is 0.2–0.6 on a mole basis and (ii) the ratio of phenol divided by polycyclic aromatic compound (excepting phenols) in said aromatic hydrocarbon oil is 0.2–0.5 on a weight basis, and wherein the hydrogenated aromatic oligomer comprises a number average molecular weight in the range of 300–1,000, and a weight average molecular weight in the range of 500–2,000.

* * * * *